(12) United States Patent
Brice et al.

(10) Patent No.: US 11,268,385 B2
(45) Date of Patent: Mar. 8, 2022

(54) HYBRID CORE PROGRESSIVE CAVITY PUMP

(71) Applicant: NOV CANADA ULC, Calgary (CA)

(72) Inventors: Ross Edward Brice, Spruce Grove (CA); Luke C. Zenke, Sherwood Park (CA)

(73) Assignee: NOV CANADA ULC, Calgary (CA)

( * ) Notice: Subject to any disclaimer, the term of this patent is extended or adjusted under 35 U.S.C. 154(b) by 63 days.

(21) Appl. No.: 16/595,281

(22) Filed: Oct. 7, 2019

(65) Prior Publication Data

US 2021/0102464 A1 Apr. 8, 2021

(51) Int. Cl.
| | | |
|---|---|---|
| *F01C 21/10* | (2006.01) | |
| *F04C 13/00* | (2006.01) | |
| *F04C 2/107* | (2006.01) | |
| *B33Y 80/00* | (2015.01) | |

(52) U.S. Cl.
CPC .......... *F01C 21/106* (2013.01); *F04C 2/1075* (2013.01); *F04C 13/008* (2013.01); *B33Y 80/00* (2014.12)

(58) Field of Classification Search
CPC .......... F04C 2/107–1075; F04C 18/107–1075; F04C 13/008; F01C 1/101
See application file for complete search history.

(56) References Cited

U.S. PATENT DOCUMENTS

| | | | |
|---|---|---|---|
| 3,912,426 A * | 10/1975 | Tschirky ................. | F01C 1/101 418/48 |
| 4,264,790 A | 4/1981 | Zlevor | |
| 4,958,790 A | 9/1990 | Nix et al. | |
| D333,296 S | 2/1993 | Stedham | |
| 5,222,013 A | 6/1993 | Schwalm | |
| 5,222,334 A | 6/1993 | Hasty | |
| 5,300,734 A | 4/1994 | Suzuki | |
| 5,620,252 A | 4/1997 | Maurer | |
| 5,639,993 A | 6/1997 | Ideno et al. | |
| D396,639 S | 8/1998 | Pedersen-rask | |
| 5,807,087 A * | 9/1998 | Brandt ................. | F04C 2/1075 418/153 |
| D419,961 S | 2/2000 | Weatherill | |

(Continued)

FOREIGN PATENT DOCUMENTS

| | | | |
|---|---|---|---|
| DE | 2316127 A1 | 10/1974 | |
| DE | 202016100894 U1 * | 3/2016 | ................ F03C 2/08 |

(Continued)

OTHER PUBLICATIONS

"International Application Serial No. PCT/US2020/037088, International Search Report dated Sep. 2, 2020", 3 pgs.

(Continued)

*Primary Examiner* — Laert Dounis
(74) *Attorney, Agent, or Firm* — Schwegman Lundberg & Woessner, P.A.

(57) ABSTRACT

A stator for a progressive cavity pump may include a containment element with an inner surface and a casing. The casing may be arranged within the containment element, be generally isolated from the inner surface of the containment element, and define a stator cavity adapted for receiving a progressive cavity pump rotor and for accommodating substantially free rotation of the progressive cavity pump rotor therein.

15 Claims, 8 Drawing Sheets

(56) References Cited

U.S. PATENT DOCUMENTS

| | | |
|---|---|---|
| 6,382,930 B1 | 5/2002 | Bahnen et al. |
| 6,467,949 B1 | 10/2002 | Reeder et al. |
| 6,967,285 B2 | 11/2005 | Sanroma et al. |
| D523,333 S | 6/2006 | Moretti |
| D578,393 S | 10/2008 | Canamasas |
| D631,185 S | 1/2011 | Ku et al. |
| D640,248 S | 6/2011 | Baumann et al. |
| D647,059 S | 10/2011 | Guo |
| 8,496,456 B2 | 7/2013 | Ree |
| D693,774 S | 11/2013 | Scime |
| D698,023 S | 1/2014 | Iseberg et al. |
| D733,690 S | 7/2015 | Zukowski |
| D734,292 S | 7/2015 | Barone |
| 9,197,956 B2 | 11/2015 | Iseberg et al. |
| D769,708 S | 10/2016 | Smith |
| D817,935 S | 5/2018 | Zukowski |
| D852,143 S | 6/2019 | Ku |
| D860,954 S | 9/2019 | Ishiguro et al. |
| D904,316 S | 12/2020 | Cartmill et al. |
| 2004/0125691 A1 | 7/2004 | Streiff et al. |
| 2005/0169779 A1 | 8/2005 | Bratu |
| 2012/0134232 A1 | 5/2012 | Schneider |
| 2013/0277116 A1 | 10/2013 | Knull et al. |
| 2015/0064037 A1 | 3/2015 | Kourakos et al. |
| 2016/0036212 A1 | 2/2016 | Murakami |
| 2016/0084085 A1* | 3/2016 | Eisner ............... F01C 1/101 418/48 |
| 2016/0126712 A1 | 5/2016 | Markham et al. |
| 2016/0247609 A1 | 8/2016 | Wang et al. |
| 2016/0254079 A1 | 9/2016 | Musick |
| 2016/0273534 A1 | 9/2016 | Melo et al. |
| 2017/0207615 A1 | 7/2017 | Trapassi et al. |
| 2017/0314552 A1* | 11/2017 | Rothschild ............ F04C 2/1075 |
| 2018/0126929 A1 | 5/2018 | Miller et al. |
| 2020/0254401 A1 | 8/2020 | Hug et al. |

FOREIGN PATENT DOCUMENTS

| | | | | |
|---|---|---|---|---|
| GB | 1235262 A | * | 6/1971 | .......... F04C 15/0096 |
| GB | 2021199 A | * | 11/1979 | ............ F04C 2/1075 |
| KR | 20040075579 A | | 8/2004 | |
| WO | WO-2005005836 A1 | | 1/2005 | |
| WO | WO-2008091262 A1 | * | 7/2008 | ............ F04C 2/1075 |
| WO | WO-2010108487 A2 | * | 9/2010 | ............ F04C 2/1075 |
| WO | WO-2020257033 A1 | | 12/2020 | |

OTHER PUBLICATIONS

"International Application Serial No. PCT/US2020/037088, Written Opinion dated Sep. 2, 2020", 5 pgs.

U.S. Appl. No. 29/650,528, filed Jun. 7, 2018, Connection Boot.

U.S. Appl. No. 16/948,090, filed Sep. 2, 2020, Static Mixer.

"U.S. Appl. No. 29/650,528, Restriction Requirement dated Feb. 24, 2021", 8 pgs.

"International Application Serial No. PCT/CA2021/000075, International Search Report dated Nov. 23, 2021", 4 pgs.

"International Application Serial No. PCT/CA2021/000075, Written Opinion dated Nov. 23, 2021", 7 pgs.

"International Application Serial No. PCT/US2020/037088, International Preliminary Report on Patentability dated Dec. 30, 2021", 7 pgs.

"Kenics—Advanced Static Mixing Technology, KMX-V Mixer", National Oilwell Varco, Internet, vol. Bulletin 805, [online]. Retrieved from the Internet: <https://www.environmentalexpert.com/downloads/kenic s-kmx-v-static-mixers-brochure-633887>, (2013), 2 pgs.

"Kenics™—Static Mixer Technology", National Oilwell Vargo, vol. Bulletin 200, Rev 02, [online]. Retrieved from the Internet: <https://www.chemineer.com/products/kenics/hevmixers/item/download/498_92dbac57b6110550a0b2d40068bd441f.html>, (2015), 12 pgs.

Karl, Kolmetz, "Static Mixer Selection, Sizing And Troubleshooting (Engineering Design Guidelines)", Internet, Rev 02, [online]. Retrieved from the Internet: <https://www.klmtechgroup.com/PDF/EDG-SYS/ENGINEERING-DESIGN-GUIDELINESstatic-mixer-Rev2.1 web.pdf>, (Apr. 2014), 23 pgs.

* cited by examiner

HYBRID CORE PROGRESSIVE CAVITY PUMP

TECHNOLOGICAL FIELD

The present disclosure relates to pumps. More particularly, the present disclosure relates to progressive cavity pumps. Still more particularly, the present disclosure relates to a progressive cavity pump having a hybrid stator adapted for increased durability and life span.

BACKGROUND

The background description provided herein is intended to generally present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A progressive cavity pump is a type of positive displacement pump and is also known as a progg cavity pump, eccentric screw pump, or cavity pump. Progressive cavity pumps may include a stator with a helically shaped cavity and may also include a helically shaped rotor arranged in the cavity. The rotor may be rotated to cause the transfer of fluids through a sequence of small, fixed shape, discrete cavities. Depending on the nature of the fluids being pumped and the amount of use, the rotor and/or the stator may wear over time and reduce the efficiency of the pump. For example, pumping of fluids may result in increased temperatures of the fluids. Moreover, some fluids may be corrosive or abrasive. In many cases, the helically shaped cavity of the stator may be formed from an elastomer material and the increased temperatures may cause the elastomer to break down over time. Corrosive fluids may eat away at metallic rotors. Similarly, abrasive materials may eat away both metallic and elastomeric materials. Wear on the stator and/or rotor may affect their original shapes and, thus, the interfaces of the stator and rotor. This may decrease the efficiencies of the pump and, as such, decrease the life span of the pump.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a stator for a progressive cavity pump may include a containment element with an inner surface and a casing. The casing may be arranged within the containment element and generally isolated from the inner surface of the containment element. The casing may also define a stator cavity adapted for receiving a progressive cavity pump rotor and for accommodating substantially free rotation of the progressive cavity pump rotor therein.

In one or more embodiments, a progressive cavity pump may include a drive system and a progressive cavity pump rotor. The rotor may be flexibly coupled to the drive system and rotationally operable by the drive system. The pump may also include a stator. The stator may include a containment element with an inner surface and the stator may also include a casing. The casing may be arranged within the containment element and generally isolated from the inner surface of the containment element. The casing may also define a stator cavity adapted for receiving the progressive cavity pump rotor and for accommodating substantially free rotation of the progressive cavity pump rotor therein.

In one or more embodiments, a method of manufacturing a progressive cavity pump stator may include printing, for example 3D printing, a casing. The casing may define a stator cavity adapted for receiving a progressive cavity pump rotor and for accommodating substantially free rotation of the progressive cavity pump rotor therein. The method may also include arranging the casing within a containment element.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE FIGURES

The drawings illustrate generally, by way of example, but not by way of limitation, various embodiments discussed herein.

DETAILED DESCRIPTION

The present disclosure, in one or more embodiments, relates to a progressive cavity pump having a stator manufactured with multiple materials and particularly adapted for increased and prolonged efficiencies as compared to known progressive cavity pumps. In particular, the stator may include an external containment tube with an elastomeric filler material and a durable cavity casing. The cavity casing may be segmented allowing for particularly precise and accurate manufacturing techniques and the segments may be particularly adapted for precise end-to-end connection to allow for a quasi-seamless assembly. The cavity casing may be a metallic or other durable casing material and, as such, may provide thermal, abrasion, and corrosion protection to the stator to increase the durability of the stator and the life span of the stator and the pump.

Figure 1:
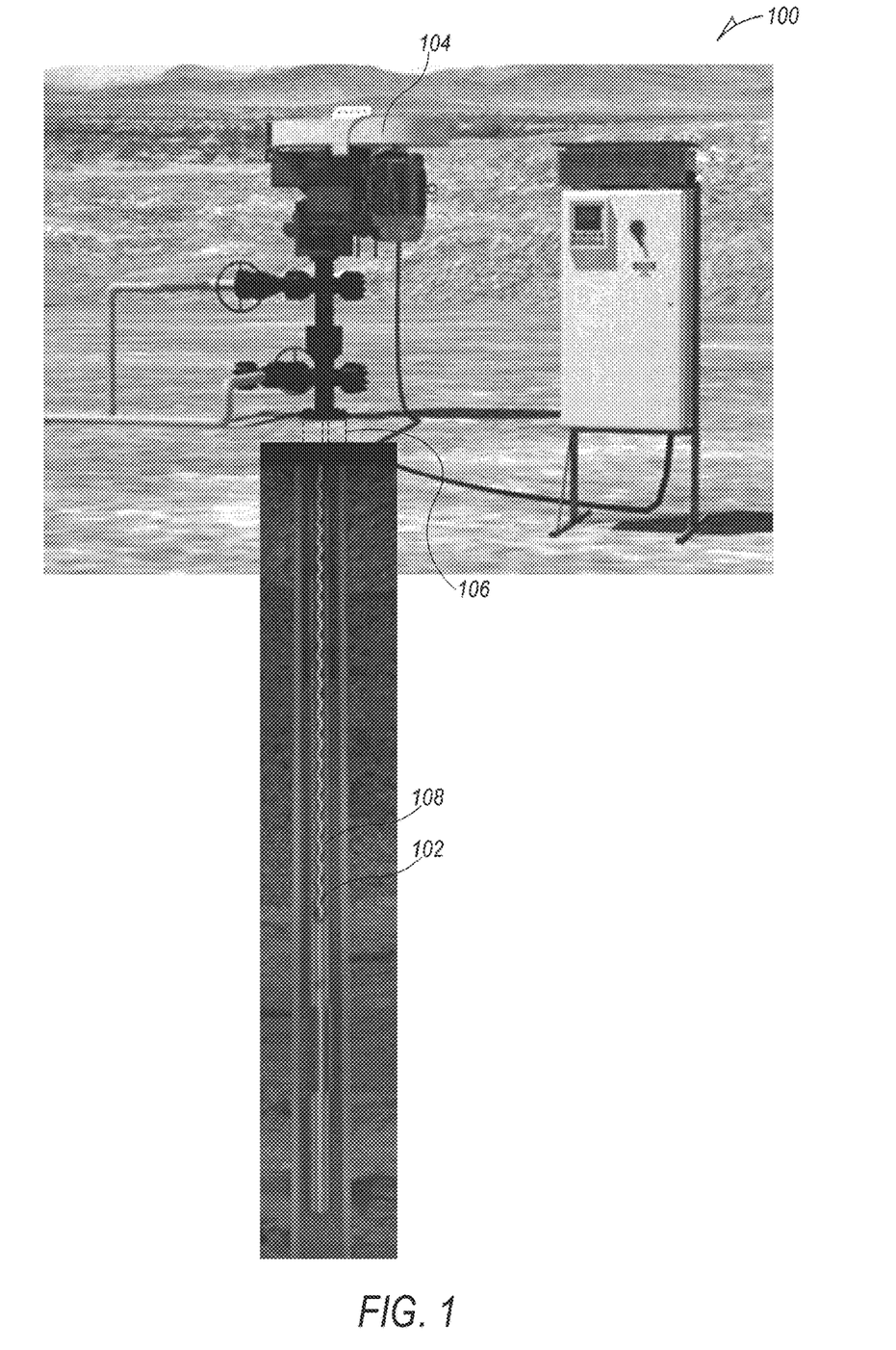
FIG. 1 shows a progressive cavity pump in use on an oil well, according to one or more embodiments.

FIG. 1 shows a pump system 100 in place on a well according to one or more embodiments. The pump system 100 may be a progressive cavity pump system configured for extracting oil. In one or more embodiments, the pump system 100 may be adapted for in situ steam oil extraction where steam is used to loosen the oil and the oil is then extracted. The pump system 100 may include a stator 102, a motor or other drive system 104, directly or indirectly, coupled to the stator 102, a drive shaft 106 extending from the drive system, a rotor 108 arranged within the stator 102 and operable by the drive system 104 and drive shaft 106 via flexible couplings. The pump system 100 may operate to rotate the rotor 108 within the stator 102 and draw or push fluid through the stator 102 due to the motion of the rotor 108.

It is to be appreciated, that while a progressive cavity pump system 100 has been shown in use on a well, the pump system and/or stator disclosed herein may be used in wide variety of applications including food applications or other fluid pumping environments. In some cases, the progressive cavity pump may be particularly suitable where there are limits on the shear stress experienced by the fluid during pumping operations. Nothing herein should be construed to limit the use of the present pump and/or stator to well or other oil-related operations.

The motor or drive system 104 may include a combustion engine, an electrically powered motor, a hydraulically powered motor, or another drive system may be provided. The motor may be adapted for inducing rotational motion to power the pump. The drive shaft 106 may extend from the motor or drive system 104 and may be adapted to transfer the rotational power or energy from the drive system to the rotor 108. Due to the helical nature of the rotor/stator cavity described below, an end of the rotor 108 proximal to the drive system 104 may oscillate in a linear, circular, elliptical, or other oscillating path. As such, the drive shaft 106 may be coupled to the motor and the rotor with flexible couplings adapted to transfer rotational power and/or energy while accommodating pivoting motion between the drive shaft 106 and the motor 104 and between the drive shaft and the rotor. For example, a double jaw-type coupling or universal joint may be provided on each end of the drive shaft. Still other flexible couplings may be provided.

The rotor 108 may extend from the drive shaft 106 and may be configured for rotating based on rotational power or energy provided by the drive system 104 and the drive shaft 106. The rotor 108 may have a circular or other cross-section and may have a helical profile. The rotor may have a circular cross-section (e.g., single lobe) or it may include multiple lobes (e.g., 2, 3, 4, 5, 6, 7, 8, 9, 10, or even more lobes). Alternatively or additionally, the rotor 108 may be particularly adapted for arrangement within a helically or other shaped cavity of a stator. That is, while helical shapes for progressive cavity pump rotors may be used, still other shapes may be provided and may be coordinated with the shape of the stator to address desired pumping characteristics. The rotor 108 may be a substantially solid rotor or a hollow rotor may be provided. The rotor 108 may be pivotally coupled to the drive shaft 106 at an end proximal to the drive system 104. The opposite end (i.e., distal to the drive system) may be a free end or the distal end may be coupled in a manner that accommodates linear, circular, elliptical, or other oscillating motion. Depending on the number of lobes of the rotor and the corresponding shape of the stator, various paths of the free end may be provided. The outer surface of the rotor may be a polished surface adapted for slidingly engaging the inner surface of the stator cavity to minimize or resist wear of the rotor and the stator. The rotational, but longitudinally stationary, motion of the rotor within the stator cavity may push or draw fluid through the stator cavity.

The stator 102 may be directly or indirectly secured to the drive system 104 to resist rotation relative to the drive system 104 such that rotational energy imparted on the rotor 108 may cause the rotor 108 to rotate relative to the stator 102. The stator 102 may, thus, be configured to push or draw fluid therethrough based on and due to the rotation of the rotor 108 within the stator 102 and based on the interactions of the rotor 108 with the inner surface of the stator cavity. The stator may include a containment element 110, a casing 112 defining a stator cavity 114, support structures 116 for the casing, and filler 118 for filling the void space between the casing 112 and the containment element 110 and for further supporting the casing 112.

Figure 2:
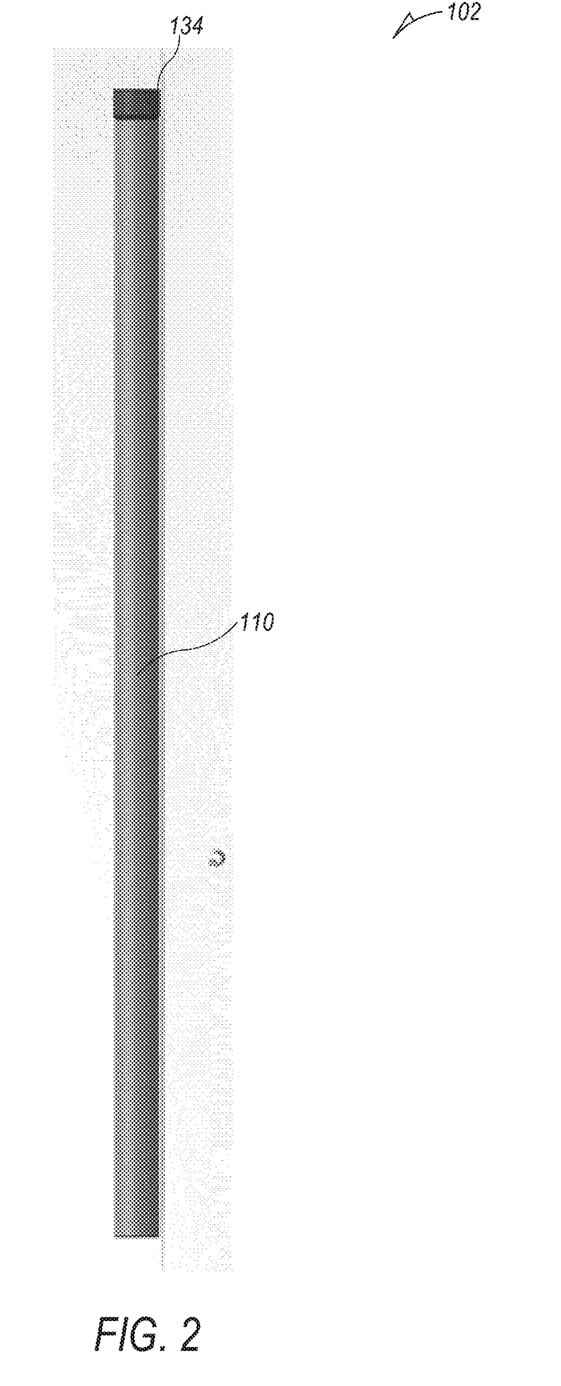
FIG. 2 shows an exterior view of a stator portion of the pump of FIG. 1, according to one or more embodiments.
Figure 3:
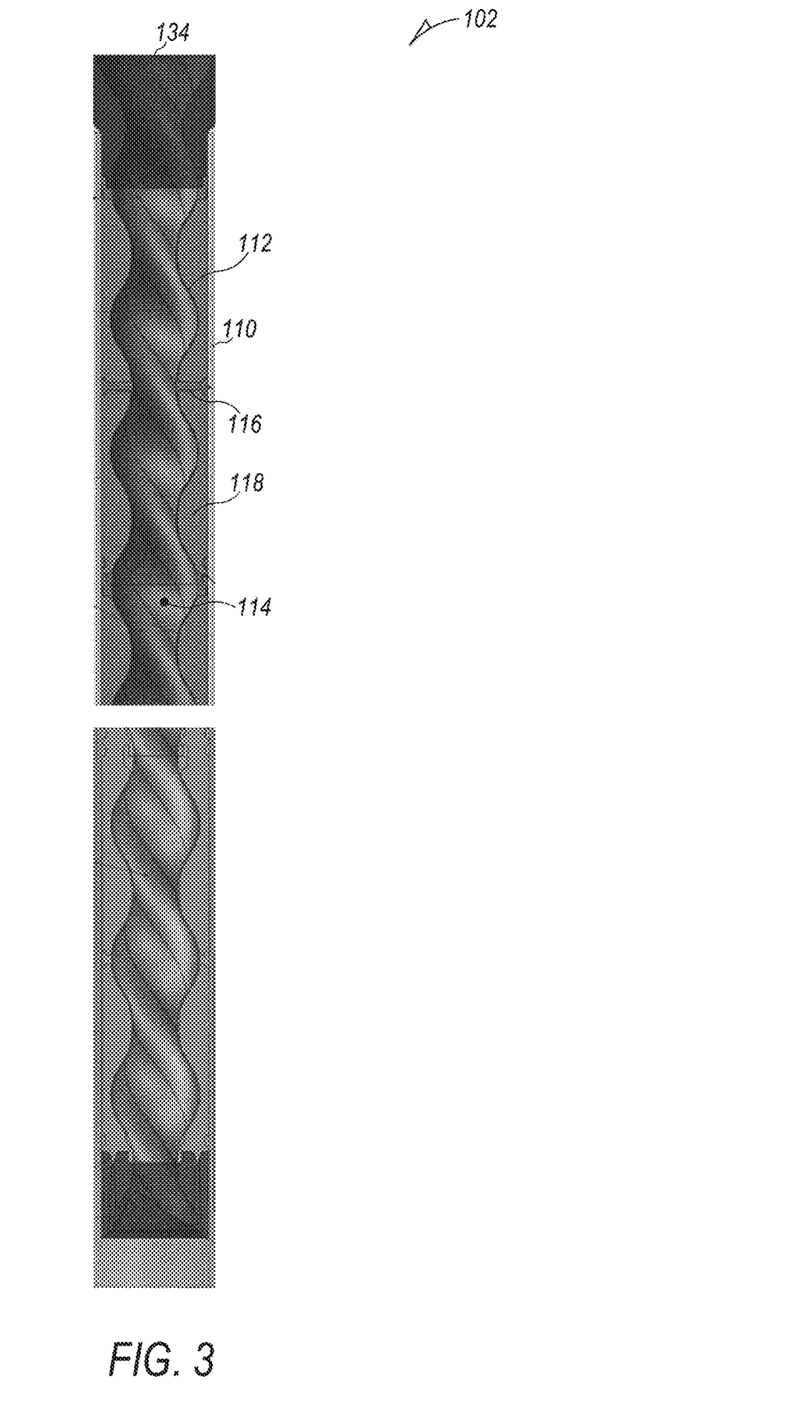
FIG. 3 shows a cross-sectional view of the stator of FIG. 2, according to one or more embodiments.
Figure 4:
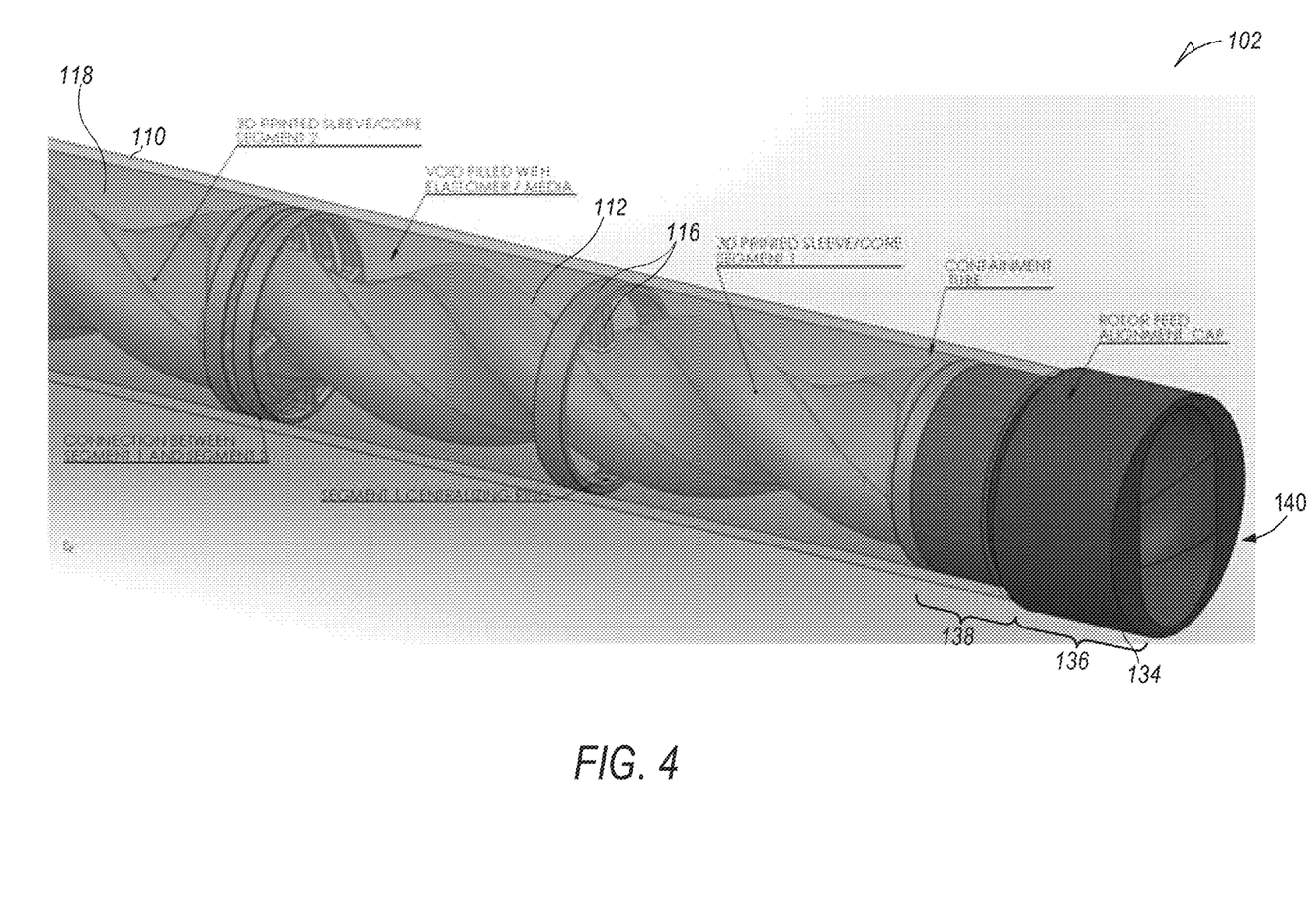
FIG. 4 shows a perspective translucent view of an inlet end of the stator of FIG. 2, according to one or more embodiments.

Referring to FIGS. 2-4, the containment element 110 may be configured to establish a space for fluid pumping operations and to contain the elements performing pumping and the fluid being pumped. The containment element 110 may include an outer wall defining an outer surface of the stator 102 and defining a boundary within which pumping operations may occur. The outer wall may be substantially continuous along a periphery and along a longitudinal length thereof. In one or more embodiments, the outer wall may be formed from one or more segments or portions establishing the substantially continuous boundary. The outer wall may be cylindrically shaped having a cylindrical outer surface and a cylindrical inner surface separated by a thickness of the outer wall. Alternatively, all or a portion of the outer wall may have a different shape such as a square, rectangular, triangular, helical, or other shape including non-geometric and/or non-uniform shapes. The containment element 110 may be sized to accommodate a cavity 114 that may, in turn, be sized to accommodate a rotating rotor 108. As such, the containment element 110 may have an inner diameter or minimum crossing dimension that exceeds a similar dimension of the rotor 108. The diameter or minimum crossing dimension may also accommodate a size, shape, and thickness of the casing 112 and the size shape and thickness of the filler portion 118 of the stator 102. In one or more embodiments, the inner diameter or minimum crossing dimension of the containment element 110 may range from approximately 1 inch to approximately 24 inches, or from approximately 2 inches to approximately 12 inches, or from approximately 3 inches to approximately 6 inches, or, for example, 4 inches. Still other sizes may be provided depending on the amount of fluid being pumped, the pumping output desired, the length and size of the pump, and other considerations. The containment element 110 may also have a length ranging from approximately 1 foot to approximately 60 feet, or approximately 8 feet to approximately 40 feet, or from approximately 16 feet to approximately 24 feet.

Figure 5:
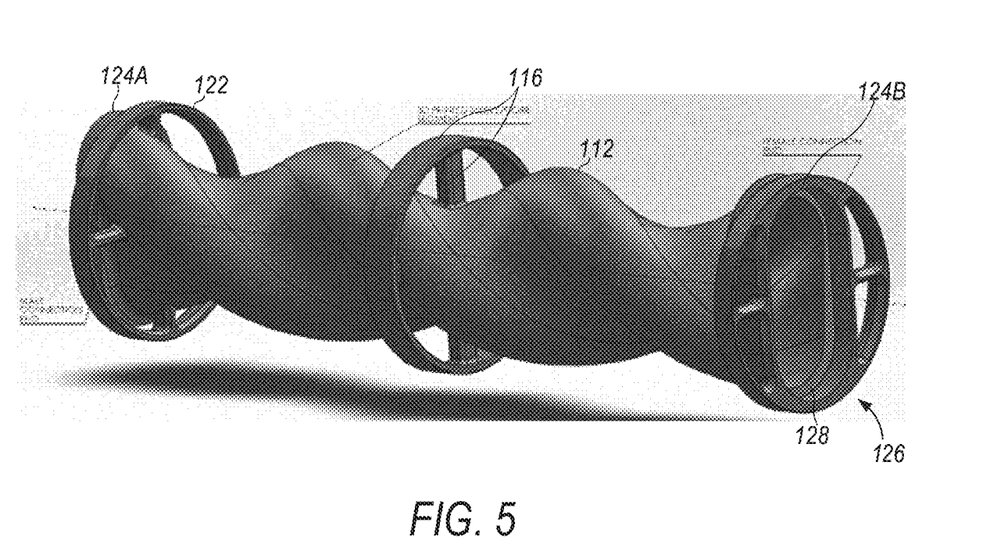
FIG. 5 shows a perspective view of a casing segment of the stator of FIG. 2, according to one or more embodiments.
Figure 6:
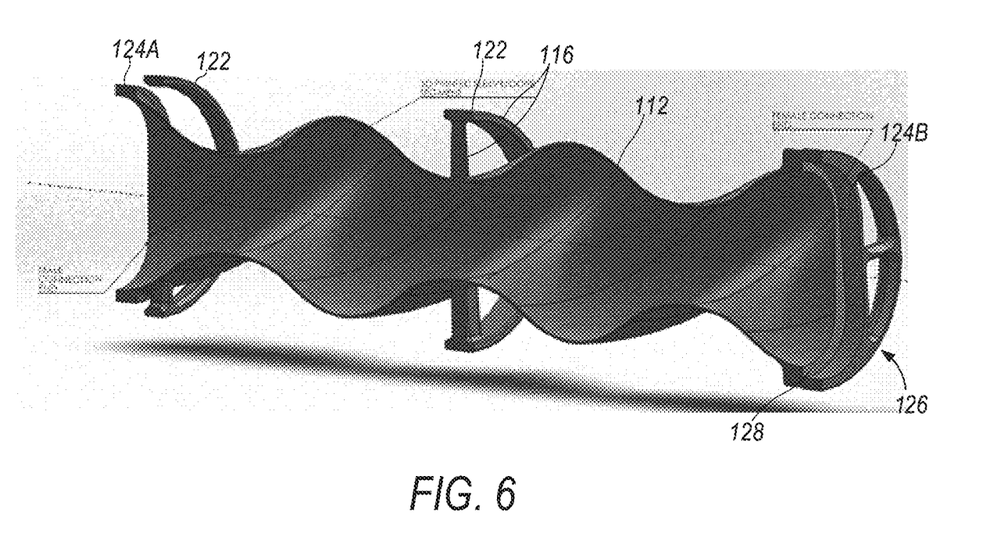
FIG. 6 shows a cross-sectional view thereof.

With continued reference to FIGS. 2-4 and additional reference to FIGS. 5 and 6, a casing 112 is shown. The casing 112 may be configured to form a stator cavity 114 through which fluid may be advanced due to rotor rotation within the cavity 114. More particularly, and in one or more embodiments, the casing 112 may have a casing wall with an inner surface defining a helical envelope adapted to interface with and accommodate rotation of a helically shaped rotor 108 while simultaneously providing volumes for advancing fluid using the rotating rotor 108. As mentioned, a wide variety of internal surface shapes may be provided depending on the efficiencies desired, the pumping specifications being addressed, and the type of stator being accommodated. That is, while a helically shaped rotor with a circular cross-section is shown, other rotor cross-sections and shapes may be provided such as helical rotors with multiple lobes and the stator cavity may be shaped accordingly. For example, in one or more embodiments, the stator may include the number of lobes of the stator plus one. For example, if a 2-lobe rotor is provided, the stator may include 3 lobes and so on. Still other combinations of lobes between the rotor and the stator may be provided. The cavity 114 of the stator 108 may be adapted to accommodate substantially free rotation of the rotor therein while also providing for advancement of fluid through the stator.

Figure 7:
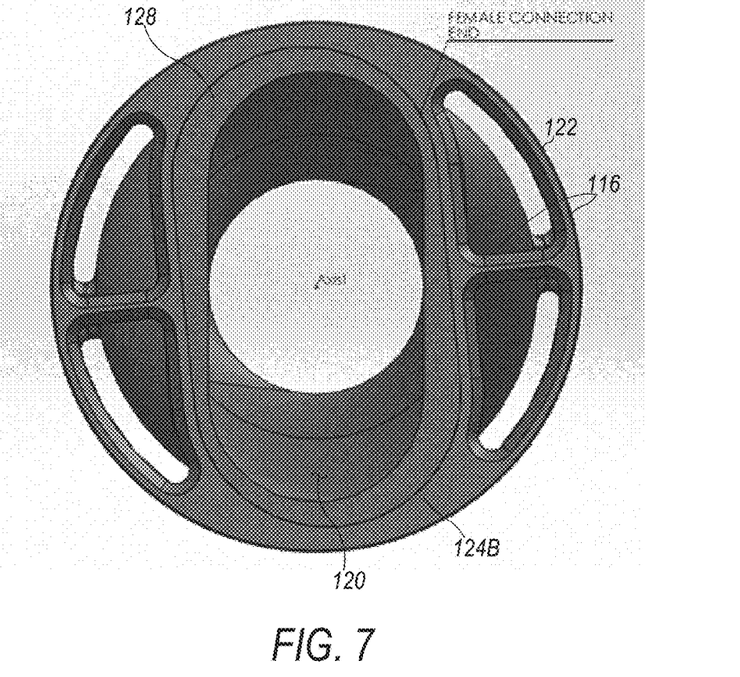
FIG. 7 shows a right end view of the casing segment of FIGS. 5 and 6, according to one or more embodiments.
Figure 8:
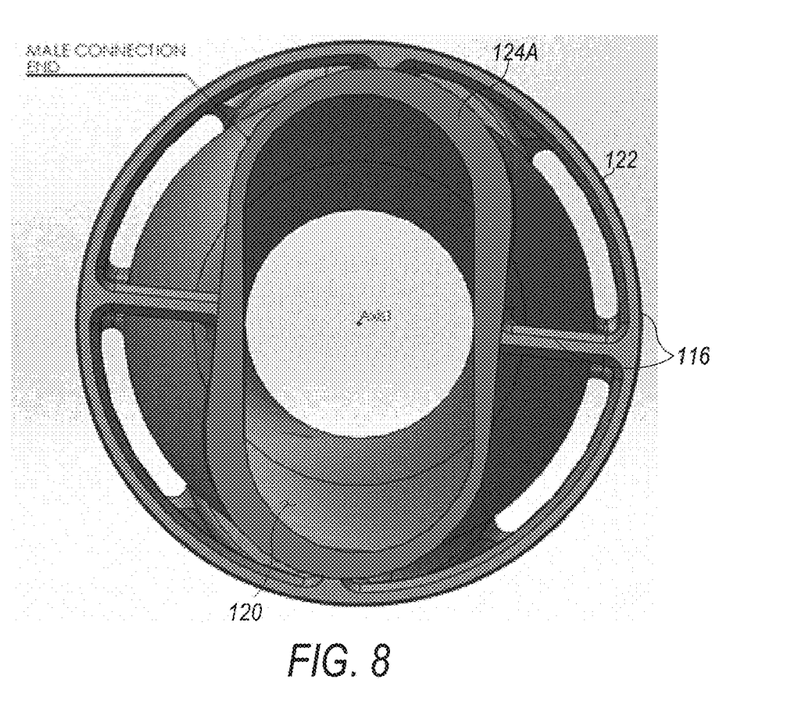
FIG. 8 shows a left end view of the casing segment of FIGS. 5 and 6, according to one or more embodiments.

In one or more embodiments, the cross-sectional shape of the inner surface 120 of the casing 112 at any given location along its length may be an extruded or stretched circle. That is, as best shown in FIGS. 7 and 8, the cross-section of the inner surface 120 may include a radiused half circle end, substantially straight sidewalls, and an opposing radiused half circle end. As such, as the rotor 108 is rotated and as its axis of rotation oscillates, each section of the rotor 108 may oscillate back and forth across its respective slot along the length of the stator 108. As shown, the orientation of the described cross-sectional shape about a central axis of the stator may vary along the length of the stator. That is, while the cross-sectional shape of the cavity 114 may be substantially constant along its length, the orientation of that cross section may be continuously changing. The casing wall may have a substantially uniform thickness and, as such, the outer surface of the casing may have a geometry that is the same or similar to the inner surface 120 (e.g., albeit offset from this geometry toward an outer area of the stator). Alternatively, the outer surface may deviate from the inner surface shape and may have a more uniform cylindrical shape. In one or more embodiments, the casing wall thickness may be greater at or near supporting structures to reinforce or strengthen the attachment points. In one or more embodiments, the casing 112 may be a 3D printed article, for example, an injection molded article, or the casing may be otherwise formed.

The casing 112 may be configured to resist thermal breakdown, abrasion, and corrosion. As such, the casing 112 may be a metallic or other relatively strong material. In one or more embodiments, the casing 112 may be a stainless steel or otherwise corrosion resistant material. Still other materials may be provided and the material may be selected depending on the nature of use of the pump and the desired longevity of the pump balanced with costs and other factors. In one or more embodiments, the casing 112 may include a polymer material, a hybrid material, composite material, a metal alloy, or a pure metal material. In one or more embodiments, the casing may include a stainless steel material such as ASTM 316L, or ASTM 718, maraging steel, tool steel, Tungsten, Inconel (625, 600), and/or ferrous or non-ferrous alloys.

The casing 112 may be supported within the containment element by one or more supports or support structures 116. That is, as shown in FIGS. 4-6, one or more supports 116 may be secured to the casing 112 and extend radially or otherwise outward toward the containment element 110. The one or more supports 116 may be configured to maintain the position of and provide structural support to the casing 112 within the containment element 110 during operation and/or during placement of the filler 118 between the containment element and the casing 112. The one or more supports 116 may be strut elements secured to the outer surface of the casing 112 at a first end and secured, directly or indirectly, to the containment element 110 at an opposite end. That is, in one or more embodiments, a support in the form of a reinforcing ring 122 may be positioned around the casing 112 at each end and at a mid-length thereof. In this embodiment, the struts may be secured to the outer surface or extend from the outer surface of the casing 112 at a first end and be secured to the reinforcing ring 122 at an opposing end. The reinforcing ring 122 may, in turn, fit within the containment element 110 and provide for a friction fit or other secured connection to the containment element 110. The strut elements may be welded or otherwise secured to the outer surface of the casing 112 and to the reinforcing ring 122 or containment element 110 or they may be integrally formed therewith such as during a 3D printing operation or an injection molding operation.

The stator 102 may also include an infill or filler portion 118. The tiller portion 118 may be configured for occupying the space between the outer surface of the casing 112 and the containment element 110 and for supporting the casing 112. The filler portion 118 may be flowed, injected, or otherwise placed around the casing 112 and within the containment element 110. In or more embodiments, the containment element 110 may include ports for injecting the filler portion 118 around the casing 112 and the supports 116 and the ports may be closed off by plug welding or otherwise sealing after the filler portion 118 has been placed. The filler portion 118 may be an elastomeric material providing for some resiliency while also providing support to the wall of the casing 112 during operations. Other thermally resistant and/or insulative filler materials may be used. Still other materials may also be selected. In still other embodiments, while a filler portion 118 may be provided, it may remain a void space and no filler material may be injected into the filler portion 118. That is, in some circumstances (e.g., small stators), the filler portion 118 may be difficult to fill and filling may be unnecessary. In some embodiments, the containment element may have a varying thickness to take-up any filler space or the filler portion 118 may be left empty, for example. In still other embodiments, the containment element may form the outer wall and the casing, for example.

Having described the general structure of the stator 102, more specific details of the casing 112 may be described. That is, the structure of the stator 102 using a casing 112, filler portion 118, and containment element 110 is unique in and of itself. However, further details of the casing 112 may allow for longer lengths of stator 102 to be manufactured and constructed, while maintaining sealing and timing from one section of the stator 102 to the next. For example, where 3D printing is used to manufacture the casing 112 or other portions of the stator 102, there may be a limit to the length of the casing 112 that may be created due to printer sizes or other factors. Still further, where injection molding is used, length limitations may also come into play based on mold sizes or other factors. As shown in FIGS. 5-8, the casing 112 may be a segmented design. As shown, constituent lengths of the stator may be created and may be strung together to create a longer casing 112, which may be arranged or positioned within a longer containment element.

As shown, each end of the casing segments may include an orientation controlling end component 124A/B. That is, the component may function as a keyway or timed key, which controls the orientation in which adjacent segments may be assembled while also maintaining that orientation during operations. In one or more embodiments, the end component may include a male 124A or a female 124B component configured for securing the segment to an adjacent segment. While the segment shown includes a male component 124A at one end and a female component 124B at another end, the segments may include male components 124A at each end or female components 124B at each end where the male-equipped or female-equipped segments may be alternated during assembly. In either case, and in one or more embodiments, the length of the segment may be selected such that the size, shape, and orientation of the stator cavity 114 is the same at each end such that the joints between segments are arranged at cyclic locations along the stator cavity. When assembled, the multiple sections of casing may establish an uninterrupted, continuous, and functionally seamless (e.g., quasi-seamless) stator cavity.

FIGS. 5-7 show an example of a female connection component 124B of a casing segment. As shown, the end of the segment may include a raised portion that is raised in the longitudinal direction around the stator cavity 114, The raised portion may have a socket 126 defined therein. The socket may have a particular geometry selected to control the orientation of the male component, That is, the geometry may be asymmetrical so as to allow for only one orientation when connecting. In other embodiments, a single axis of symmetry may be provided where the male part may be secured in a first orientation or a second orientation 180 degrees from the first orientation. Other approaches to controlling and/or managing relative orientation of the parts may be provided. The socket may be sized to surround the stator cavity 114 and provide a shelf 128 around the perimeter of the stator cavity 114 for abutment with the male component 124A. The socket 126 may be sized to provide for a shelf around the full perimeter of the stator cavity 114 and may be selected to accommodate for continued propagation of the orientation of the stator cavity 114 as it moves through the joint. That is, the raised portion of the female component 124B may define a joint length along the length of the segment and the continual changing orientation of the cross-section of the stator cavity 114 may be accommodated throughout the length of the joint. The socket size and orientation may be selected and/or oversized to accommodate this changing orientation.

FIGS. 5, 6, and 8 show an example of a corresponding male connection component 124A of a casing segment. As shown, the end of the segment may include an enlarged portion sized and shaped to fit into the socket 126 of the female component 124B while also allowing the continuous propagation of the stator cavity shape to pass therethrough. The size, shape, and orientation of the stator cavity 114 of the male component 124A at its outer most end may match the size, shape, and orientation of the stator cavity 114 of the female component at the shelf 128 of the female component 124B. In this manner, the male and female components may allow for connection of the segments end to end and the relative rotational orientation of the stator cavity 114 from one segment to the next segment may be continuous and functionally seamless. That is, the timing from one segment to the next segment may be maintained and continuous along a length of two or more segments connected end to end. Additionally or alternatively, alignment pins may be used to match up and secure segments to one another. Additionally or alternatively, a seal may be provided between the segments.

Referring to FIGS. 2, 3, 4, and 9, an end cap 134 is shown. In one or more embodiments, the end cap 134 may include a rotor feed alignment cap. That is, the end cap 134 may be configured for fluidly capping the containment element 110, accommodating feeding of the rotor 108 into the stator 102, and maintaining the alignment of the rotor 108 during use. Various features of the end cap 134 may help to perform these functions and the main portions of the end cap may include an outer cap portion 136 and a plug 138.

The outer cap 136 portion may have a diameter or other crossing dimension larger than an outer diameter or largest crossing dimension of the containment element 110 so as to seat against an end of the containment element 110. The outer cap 136 may be substantially cylindrical or a square, triangular, or other cross-sectional shape may be provided. The outer cap 136 may extend away from the containment element 110 by a length that may be substantially equal to or slightly shorter than the diameter or crossing dimension of the outer cap portion 136. The outer cap portion 136 may include a recess 140 in a proximal end (e.g., end closest to the driving power source or drive shaft). The recess 140 may be sized and shaped to accommodate a distal end of a helically shaped rotor 108. In one or more embodiments, the rotor 108 may have a round cross-section and the recess may be a shape that is the same or similar to the cross-sectional shaped of the stator cavity 114. Moreover, the progression of the cross-sectional shape of the stator cavity 114 may continue through the end cap 134 and upward and into the outer cap portion 136 so as to continue the changing orientation of the cavity cross-section of the stator 108 into the end cap 134.

The plug portion 138 of the end cap 134 may be sized for a snug fit within the containment element 110 and, as such, may seal the end of the containment element 110 against escape of the filler material 118 and the pumped fluid. The recess in the outer cap portion 136 may continue through the plug portion 138 as it approaches the stator 102. For sealing against escape of the pumped fluid, the distal end of the plug portion 138 may be sized, shaped, and configured to engage a male or female end 124A/B of the stator 108 and, as such, may include the same or similar features as a male or female end 124A/B of a stator segment depending on which end of an adjacent stator segment the plug is engaging.

Figure 9:
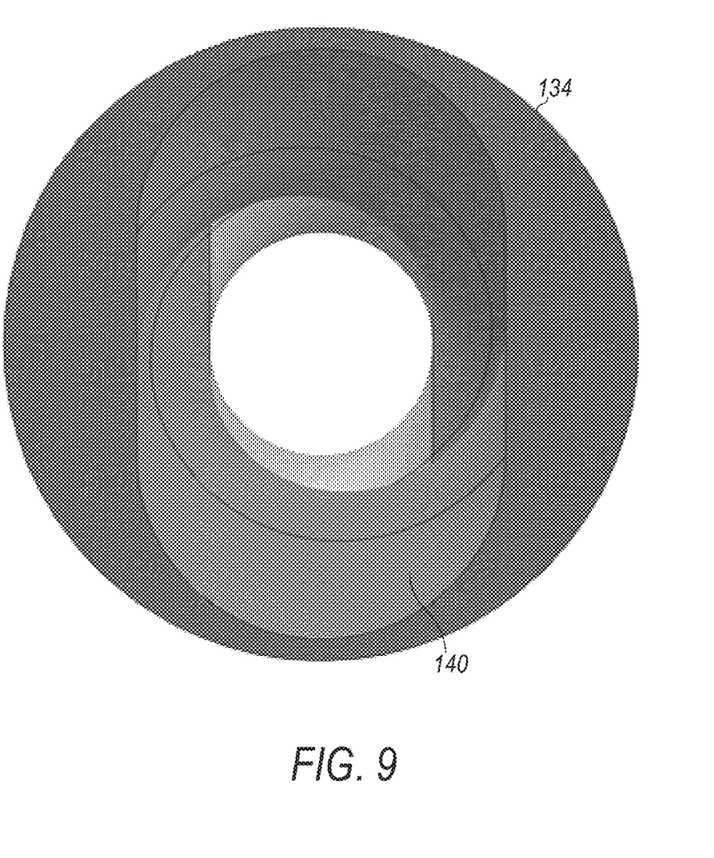
FIG. 9 shows an outlet end view of the stator of FIG. 2, according to one or more embodiments.

FIG. 9 shows a longitudinal view of the end cap 134 which depicts the shape of the recess 140 and the changing orientation of the recess cross-section as it moves through the end cap. As such, the distal end of the stator may reciprocate back and forth across the distal portion of the end cap when the pump is in use.

Referring back to FIG. 3, a distal end plug may also be provided. The distal end plug may be a machined or printed part and may be welded in place or otherwise secured. The plug may have one of several shapes which may change from design to design and may be based on customer requirements. Still further, one or more accessories may be provided, which may affect the shape of the end plug. Still further considerations may be included in determining the end plug size and shape.

It is to be appreciated that the segmented nature of the stator may allow for varying the length of the pump being constructed by increasing or decreasing the number of segments used to construct the pump. The containment element may likewise be sized to accommodate the number of segments selected. As such, the design may allow for flexibility in the size and/or length of the pump. Moreover, the casing of the stator may be constructed of durable material while excessive cost and weight of the stator may be avoided by avoiding use of the durable material throughout the thickness of the stator and to the outer surface. Rather, a thinner casing may be used, which may be backed by a lighter filler material to fill out the void space and extend the full thickness out to the size of the containment element.

Figure 10:
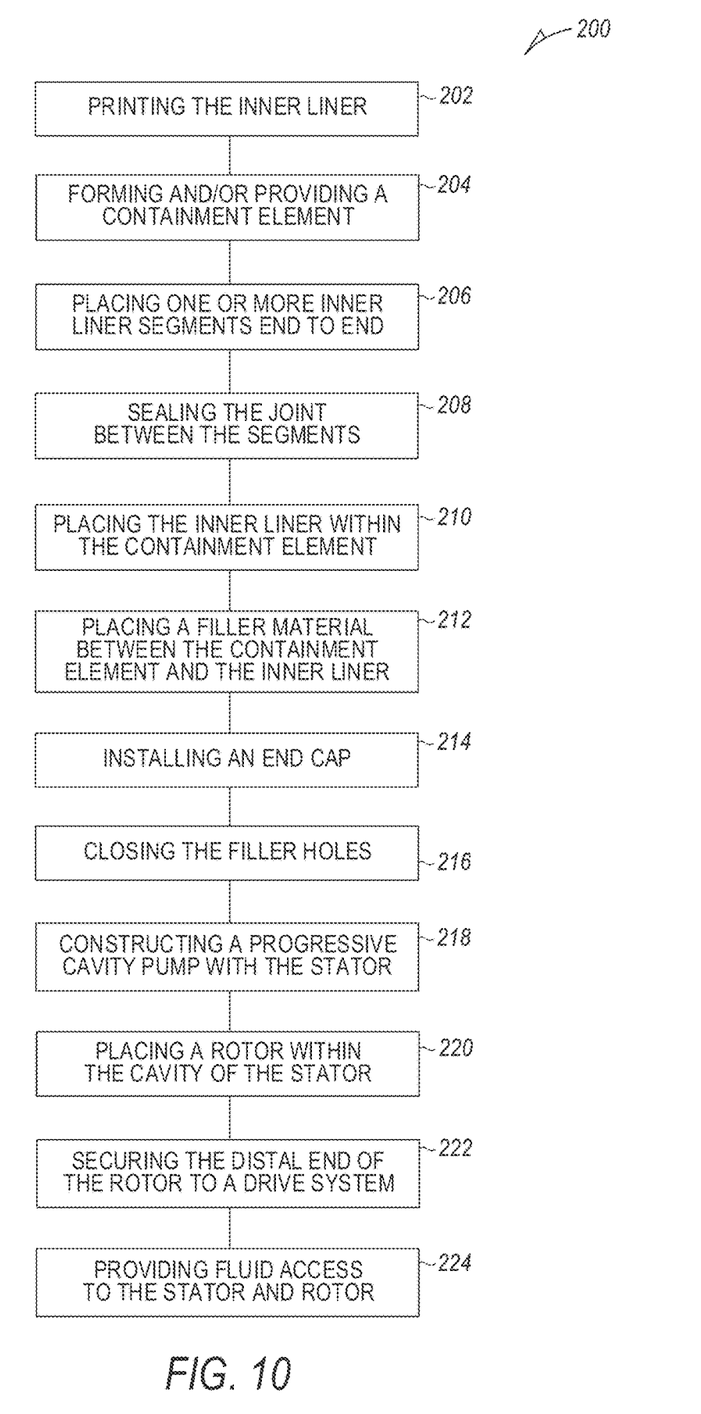
FIG. 10 is a diagram of a method of manufacturing a casing, according to one or more embodiments.

A method of manufacture 200 may include a process of 3D printing the casing. The 3D printing process may include printing 202 the casing. Printing the casing may also include printing the support structures and/or printing the orientation controlling end components such as a male and a female end, two male ends, or two female ends. The method of manufacture may also include forming 204 and/or providing a containment element such as a hollow cylindrical tube. The method of manufacture may also include placing 206 one or more casing segments end to end and sealing 208 the joint between the segments by welding, providing an adhesive, placing a gasket, o-ring, or by providing another sealing technique. The casing may be placed 210 within the containment element and a filler material may be injected, pumped, flowed, or otherwise placed 212 between the containment element and the casing. The end cap may be placed 214, which may occur before or after the addition of the filler material. Where the end cap is placed before injecting the filler material, injection holes may be used to inject the filler material and closure 216 of the filler holes by welding, plugging, or otherwise closing off the filler holes may be provided. The constructed stator may then be used to construct 218 a progressive cavity pump by placing 220 a rotor within the cavity of the stator, securing 222 the distal end of the rotor to a drive shaft and securing the drive shaft to a drive system or motor. Several approaches to providing 224 fluid access to the stator and rotor may be provided and/or performed.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A stator for a progressive cavity pump, comprising:
a containment element with an inner surface; and
a casing arranged within the containment element, generally isolated from the inner surface of the containment element, and defining a stator cavity adapted for receiving a progressive cavity pump rotor and for accommodating substantially free rotation of the progressive cavity pump rotor therein, wherein, the casing comprises a plurality of segments each having an end component arranged on an end thereof that is configured to limit the orientation in which adjacent segments are assembled to orientations that provide a functionally seamless stator cavity.

2. The stator of claim 1, wherein the stator cavity has a substantially constant cross-sectional shape with a continually changing orientation.

3. The stator of claim 1, wherein the end component comprises at east one of a male end component and a female end component.

4. The stator of claim 1, wherein the end component comprises a longitudinal length and the substantially constant cross-sectional shape and the continually changing orientation thereof is maintained along the longitudinal length and through the end component.

5. The stator of claim 1, wherein the casing is supported in general isolation from the containment element by support structures.

6. The stator of claim 1, further comprising support structures extending from an outer surface of the casing and configured for supporting the casing within the containment element.

7. The stator of claim 1, further comprising filler arranged between the casing and the inner surface of the containment element.

8. The stator of claim 7, wherein the casing comprises a metallic material and the filler comprises an elastomer material.

9. A progressive cavity pump, comprising:
a drive system;
a progressive cavity pump rotor flexibly coupled to the drive system and rotationally, operable by the drive system; and
a stator comprising:
a containment element with an inner surface; and
a casing arranged within the containment element, generally isolated from the inner surface of the containment element, and defining a stator cavity adapted for receiving the progressive cavity pump rotor and for accommodating substantially free rotation of the progressive cavity pump rotor therein, wherein, the casing comprises a plurality of segments each having an end component arranged on an end thereof that is configured to limit the orientation in which adjacent segments are assembled to orientations that provide a functionally seamless stator cavity.

10. The pump of claim 9, wherein the stator cavity has a substantially constant cross-sectional shape with a continually changing orientation.

11. The stator of claim 9, wherein the end component comprises a longitudinal length and the substantially constant cross-sectional shape and the continually changing orientation thereof is maintained along the longitudinal length and through the end component.

12. A method of manufacturing a progressive cavity pump stator, comprising:
printing a casing defining a stator cavity adapted for receiving a progressive cavity pump rotor and for accommodating substantially free rotation of the progressive cavity pump rotor therein, wherein printing further comprises printing an end component with the casing that is configured to limit the orientation in which adjacent segments are assembled to orientations that provide a functionally seamless stator cavity; and
arranging the casing within a containment element.

13. The method of claim 12, wherein printing the casing comprises printing a plurality of segments of the casing and assembling the plurality of segments end to end to form the casing.

14. The method of claim 8, wherein printing the casing further comprises printing support structures adapted for supporting the casing within the containment element.

15. The method of claim 12, further comprising placing filler material between the casing and the containment element.

* * * * *